June 23, 1970 J. L. WORCESTER 3,517,346

PULSE GENERATOR CIRCUIT

Filed Jan. 3, 1966

INVENTOR.

JOHN L. WORCESTER

BY

Flehr and Swain

ATTORNEYS

United States Patent Office 3,517,346
Patented June 23, 1970

3,517,346
PULSE GENERATOR CIRCUIT

John L. Worcester, Walnut Creek, Calif., assignor to E-H Research Laboratories, Inc., Oakland, Calif., a corporation of California Filed Jan. 3, 1966, Ser. No. 518,211
Int. Cl. H03h 7/30
U.S. Cl. 333—31 6 Claims

ABSTRACT OF THE DISCLOSURE

A timing circuit having a closed loop in the form of a stripline with an input directional coupler for coupling input pulses to the loop and producing a circulating pulse which is coupled out by an output directional coupler to produce a pulse train having a repetition rate determined by the loop length.

The present invention is directed to a timing circuit, and more particularly to a circuit which provides output pulses having a predetermined pulse repetition rate.

In the electrical measurement art it is often necessary to calibrate the timing circuits of such devices such as oscilloscopes, as, for example, the sweep rate. Such a calibrating device or timing circuit should be very accurate. Preferably, the timing circuit should not be unduly complex to require frequent adjustment and calibration, and should also be inexpensive.

It is an object of this invention to provide an improved timing circuit.

A further object of the invention is to provide a timing circuit which is accurate, of simple construction, and relatively inexpensive.

In accordance with above objects, the invention is characterized by a timing circuit which includes a closed loop transmission line having a predetermined length. Means are provided which are responsive to an externally applied input pulse for coupling pulse energy into the line. The pulse energy coupled into the line circulates in the transmission line and is sensed by output coupling means which provide an output pulse each time the circulating pulse passes by. Since the length of the endless transmission line is fixed, a pulse train having a predetermined precise repetition rate suitable for use as a calibrating standard is generated.

Further objects and features of the invention will appear from the following description in which the preferred embodiment of the invention has been set forth in detail in conjunction with the accompanying drawing.

Referring to the drawing.

Figure 1:
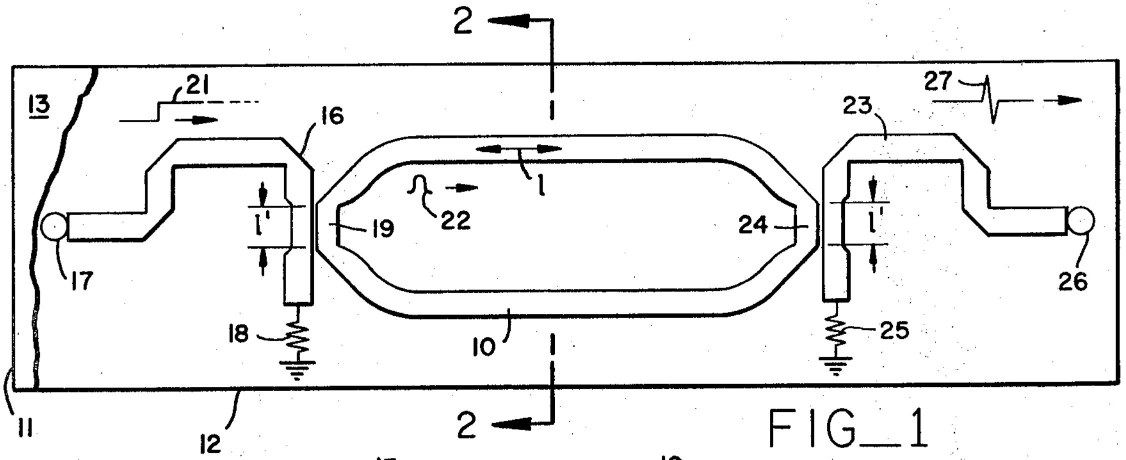
FIG. 1 is a plan view, partially cut away, showing an improved timing circuit embodying the present invention.
Figure 2:
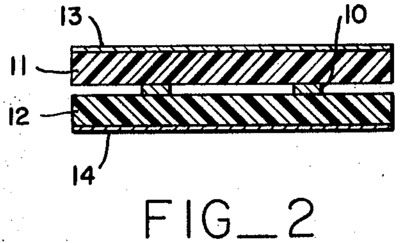
FIG. 2 is a sectional view taken along line 2—2 of FIG. 1.

The circuit of the present invention is incorporated in a planar transmission line or stripline. The circuit is best illustrated in FIGS. 1 and 2 where an endless or closed loop strip conductor 10 is sandwiched between insulating layers 11 and 12. Each layer has on its outside surface a continuous conducting ground plane 13 and 14, respectively. By the use of a sandwiched construction, radiation problems are eliminated along with undesired moding of the electromagnetic wave. Strip conductor 10 has a predetermined mean path length designated by "$l$" which is critical as will be discussed below.

The timing circuit also includes means responsive to an input pulse for coupling pulse energy into the planar transmission line which includes strip conductor 10. These input means include an input strip conductor 16 which is coupled to an input pulse source (not shown) by a terminal 17, and is terminated in a non-reflective characteristic impedance 18. This terminating impedance is indicated schematically only and may either be an external resistor or, preferably, an integrated part of the stripline circuit. Energy is coupled to this line by a parallel line directional coupler. Specifically, a U-shaped coupling section 19 is included in loop conductor 10 in close proximity to strip 10 for coupling pulse energy to it. The length $l'$ (in time) of the coupling section is selected to be short relative to the input pulse duration as will be discussed more fully below. As illustrated, an input pulse 21 traveling to the right induces in the loop conductor 10 a circulating pulse 22 traveling in an opposite direction. The characteristic terminating impedance 18 prevents any reflections of the pulse transmitted through the coupling section.

Output coupling means for coupling energy from transmission line 10, 11 and 12 is provided which is similar to that of the input coupling means. More particularly, an output strip conductor 23 couples to a coupling section 24 having a length $l'$ of strip conductor 10. Output conductor 23 is terminated in a characteristic impedance 25 and has an output terminal 26 on which an output pulse train 27 is present. Again as described in connection with the input coupler 19, output coupler section 24 couples energy to terminal 26 only as a result of energy on line 10, 11, 12 which is traveling in a clockwise direction. The characteristic impedance 25 terminates any energy coupled in the reverse direction due to circuit imperfections.

In accordance with the invention, the period "T" between pulses of output pulse train 27, or in other words the pulse repetition rate, is determined by the length "$l$" of the endless transmission line 10, 11, 12. For a transverse electromagnetic (TEM) mode of propagation, the phase velocity $v_p$ of a circulating pulse is proportional to the square root of the reciprocal of the inductance per unit length times the capacitance per unit length of the transmission line which, of course, are dependent on its dimensions such as the width of the strip conductor and its spacing from the ground plane, and the dielectric material.

Each circuit of the pulse around the loop produces an output pulse which, due to losses, is attenuated compared to the previous output pulse. Specifically, these losses are largely due to the coupling of the pulse energy on the loop 10 to both the output and input couplers, and secondarily some heating losses are present. To obtain an output pulse train of sufficient amplitude and duration, a compromise must be made between pulse train duration and the desired amplitude initial output pulse. Given a particular amplitude input signal 21, the more efficient the coupling between loop conductor 10 and the input and output conductor 16 and 23, the larger the initial signal. But, the more efficient coupling will cause a faster decay of the circulating energy since each time the pulse circulates, energy is coupled out by both the output coupler and the input coupler. Thus, for a pulse train sufficient for calibration purposes, some sacrifice must be made in the output pulse amplitude.

Figure 3:
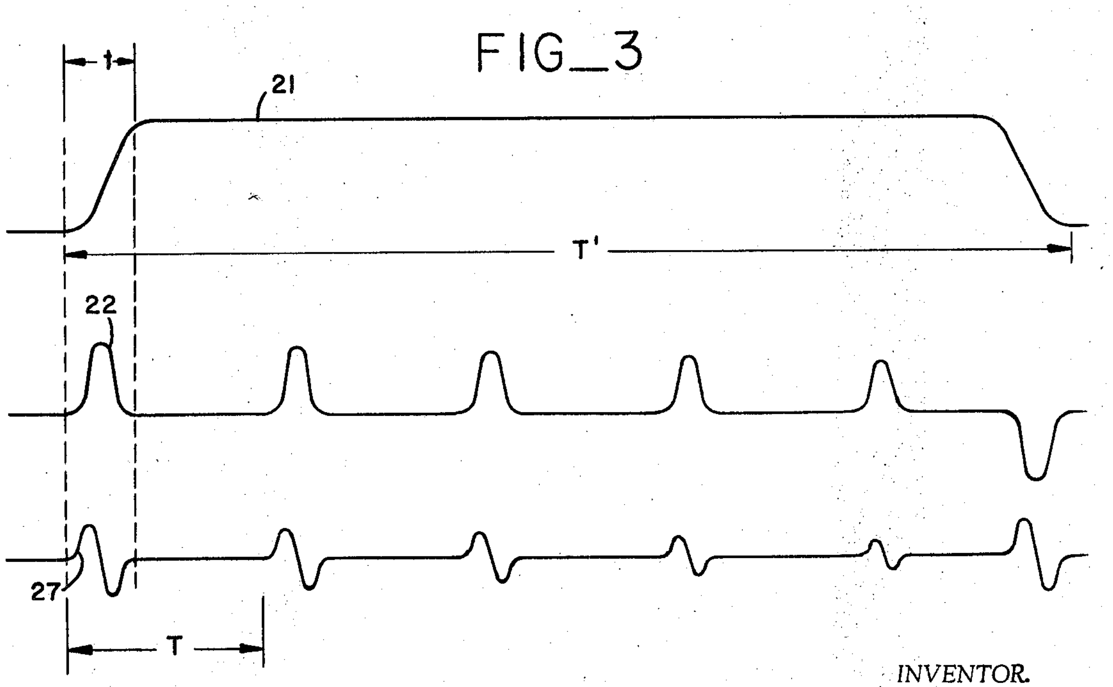
FIG. 3 shows typical pulses.

FIG. 3 illustrates the time relationship of the input pulse 21, circulating pulses 22 and output pulses 27.

For optimum performance, certain time relationships should be observed. First, the rise time $t_r$ of input pulse 21 should be short compared to the period T, of the output pulses 27. This provides for good observation of the period since the output pulses, which mark the beginning and end of a period, will be relatively short compared to the period itself. A short rise time provides a short output pulse since energy is only coupled to loop conductor 10 during the time, $t$ during which there is a change in the input voltage. Equation 1 expresses this requirement:

$$t \ll T \quad (1)$$

A second requirement for optimum performance is that the coupling sections 19 and 24 be made short so that the electrical transit time through the section is short compared to the rise time $t$, of the input pulse 21. Since there are two successive couplings, the output signal 27 is the second derivative of the input signal thus providing a much more sharply peaked pulse for calibration purposes. Equation 2 expresses this characteristic:

$$l'/v_p \ll t \quad (2)$$

where $l'$ is the effective length of the coupling sections and $v_p$ is the phase velocity of the wave on loop conductor 10.

One last precaution that must be observed is that because the coupler responds to any change in the input signal, the turn-off time T', of the input signal 21 must occur at a much later time as compared to the useful time of the pulse train to avoid obscuring the pulse train. FIG. 3 shows the generation of disturbing pulses. Equation 3 illustrates the required condition:

$$T \ll T' \quad (3)$$

The following example gives dimensions and operating characteristics for a timing circuit embodying the present invention:

Input pulse 21:
- Rise time—200 picoseconds
- Pulse width—greater than 10 nanoseconds
- Amplitude—10 volts Output puulse 27:
- Amplitude—±100 millivolts
- Period—1 nanosecond
- Train duration—10 pulses (last pulse half amplitude of first)

Circuit dimensions:
- $l$—7.8 inches
- $l'$—.3 inch

Average width of conductor 10—.2 inch

Thus, the present invention, by use of a closed loop transmission line, provides a simple and accurate timing circuit providing precisely timed pulse trains.

I claim:

1. A pulse generator circuit comprising a closed loop transmission line having a predetermined length, means responsive to an input pulse for coupling pulse energy into said line to form a pulse circulating in the line, means coupled to said line for coupling energy therefrom, said last means serving to provide an output pulse each time the circulating pulse travels thereby, whereby the time interval between said pulses is determined by the length of the endless transmission line said output pulses forming a pulse train having a repetition rate determined by said length of said transmission line.

2. A pulse generator circuit as in claim in in which said endless transmission line is of the stripline type.

3. A pulse generator circuit as in claim 1 in which said means responsive to an input pulse includes a directional coupler for supplying pulse energy into said line, and said output coupling means also includes a directional coupler for coupling said pulse energy out of said line.

4. A pulse generator circuit as in claim 1 in which the input pulse has a time duration which is much greater than said time interval between said output pulses for preventing interference by a later pulse train by output pulses caused by turn-off of said input pulses.

5. A pulse generator circuit as in claim 1 in which said input pulse has a predetermined rise time which is much less than said time interval between said output pulses for providing an output pulse train of said output pulses having a time interval between such output pulses which is independent of the characteristic of said input pulse rise time.

6. A pulse generator circuit as in claim 3 in which each of said couplers has an effective length which provides a transit time for said circulating pulse which is much less than the rise time of said input pulse.

References Cited

UNITED STATES PATENTS

| | | | |
|---|---|---|---|
| 2,930,004 | 3/1960 | Coales | 333—924 |
| 3,192,397 | 6/1965 | Nethorcot | 33—18 |
| 3,146,413 | 8/1964 | Butler | 333—31 |
| 3,051,844 | 8/1962 | Beam et al. | 307—88 |
| 3,310,748 | 3/1967 | Putnam | 325—446 |

HERMAN K. SAALBACH, Primary Examiner

C. BARAFF, Assistant Examiner

U.S. Cl. X.R.

33—10, 84, 70; 328—56